(12) United States Patent
Prior

(10) Patent No.: US 7,814,966 B2
(45) Date of Patent: Oct. 19, 2010

(54) VARIABLE FLOW HEAT EXCHANGER SYSTEM AND METHOD

(75) Inventor: Gregory P. Prior, Birmingham, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 167 days.

(21) Appl. No.: 11/671,007

(22) Filed: Feb. 5, 2007

(65) Prior Publication Data

US 2008/0185125 A1 Aug. 7, 2008

(51) Int. Cl.
*F28D 11/00* (2006.01)

(52) U.S. Cl. .......................................... 165/86; 165/98

(58) Field of Classification Search .................. 165/41, 165/86, 98, DIG. 93, DIG. 96, DIG. 109, 165/DIG. 119, DIG. 123, DIG. 125, DIG. 138
See application file for complete search history.

(56) References Cited

U.S. PATENT DOCUMENTS 1,990,468 A * 2/1935 Bridges ...................... 165/103
2,105,692 A * 1/1938 Hunicke ....................... 165/86
5,386,873 A * 2/1995 Harden et al. ................. 165/47
2004/0069284 A1* 4/2004 Corba .......................... 123/563
2006/0021606 A1* 2/2006 Bryant ........................ 123/562

FOREIGN PATENT DOCUMENTS

JP 2005-112186 A 4/2005
KR 10-2005-0035631 A 4/2005

* cited by examiner

*Primary Examiner*—Teresa J Walberg
(74) *Attorney, Agent, or Firm*—Quinn Law Group, PLLC

(57) ABSTRACT

A heat exchanger system is provided including a first and second heat exchanger each configured to pass air therethrough. The second heat exchanger is mounted upstream of the first heat exchanger. The second heat exchanger may be selectively movable between a first position and a second position such that an amount of the air is diverted from the second heat exchanger to the first heat exchanger when the second heat exchanger is in the first position. Alternately, the second heat exchanger may be spaced from the first heat exchanger, with at least one selectively openable shutter mounted adjacent to the first and second heat exchangers. The at least one shutter is movable between a first position and a second position such that an amount of the air is diverted from the second heat exchanger to the first heat exchanger when the at least one shutter is in the first position.

18 Claims, 1 Drawing Sheet

VARIABLE FLOW HEAT EXCHANGER SYSTEM AND METHOD

TECHNICAL FIELD

The present invention relates to a vehicular heat exchanger system and method of operation.

BACKGROUND OF THE INVENTION

A water cooled vehicular internal combustion engine typically requires a radiator to dissipate heat produced by the internal combustion engine. Additionally, a vehicular air conditioning system requires a condenser, which is positioned in front of the radiator and is operable to cool refrigerant contained therein. The internal combustion engine may include a supercharger to provide pressurized air, or boost, to the internal combustion engine thereby increasing the volumetric efficiency thereof. An intercooler radiator may be provided in front of the condenser to cool the intercooler liquid, which in turn cools the intake air prior to communication to the internal combustion engine. By cooling the intake air, increases in intake air density and greater spark advance are made possible, which typically equate to improved engine performance and efficiency.

Vehicle designers typically compromise the size of the intercooler radiator due to the fixed nature of the air flow path through the three heat exchangers (intercooler radiator, condenser, and radiator). In other words, to maintain acceptable engine cooling performance and air conditioner performance, the frontal area of the intercooler radiator is sized substantially smaller than the frontal area of the condenser and radiator. This results in acceptable air flow to the radiator and condenser at low vehicle speeds, such as when operating the vehicle in city traffic. This arrangement does, however, reduce the effectiveness of the intercooler radiator when operating the internal combustion engine, and the vehicle so equipped, in a high performance aggressive driving schedule. For example, at high vehicle speeds, typical of high boost operation, the intercooler radiator could be larger, perhaps even as large as the condenser, and not negatively impact the performance of the air conditioning system since the added restriction of the larger intercooler radiator would not be a concern due to the overall "ram air" effect present at high vehicle speeds. However, such a configuration may be unacceptable at low vehicle speeds due to the increased restriction of the larger intercooler radiator causing a reduction in air flow through the condenser and radiator.

SUMMARY OF THE INVENTION

A heat exchanger system is provided including a first and second heat exchanger each configured to pass air therethrough. The second heat exchanger is mounted upstream of the first heat exchanger. The second heat exchanger may be selectively movable between a first position and a second position such that an amount of the air is diverted from the second heat exchanger to the first heat exchanger when the second heat exchanger is in the first position. Alternately, the second heat exchanger may be spaced from the first heat exchanger, with at least one selectively openable shutter mounted adjacent to the first and second heat exchangers. The at least one shutter is movable between a first position and a second position such that an amount of the air is diverted from the second heat exchanger to the first heat exchanger when the at least one shutter is in the first position.

A method of operating the heat exchanger system for a vehicle having a radiator operable to cool an internal combustion engine and an intercooler radiator operable to cool intake air communicated to the internal combustion engine is also provided. The radiator and the intercooler radiator are configured to pass air therethrough. The method includes the steps of: A) directing air through each of the radiator and intercooler radiator when the vehicle is operating in a first predetermined operating condition; and B) diverting an amount of air away from the intercooler radiator and to the radiator when the vehicle is operating in a second predetermined operating condition.

The first predetermined operating condition may be at least one of vehicle being speed greater than or equal to a predetermined vehicle speed value and intake air temperature being greater than or equal to a predetermined intake air temperature value. The second predetermined operating condition may be at least one of vehicle speed being less than a predetermined vehicle speed value, air temperature being greater than or equal to a predetermined air temperature value, intake air pressure being less than a predetermined intake air pressure value, and air conditioning system head pressure being greater than or equal to a predetermined air conditioning system head pressure value.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
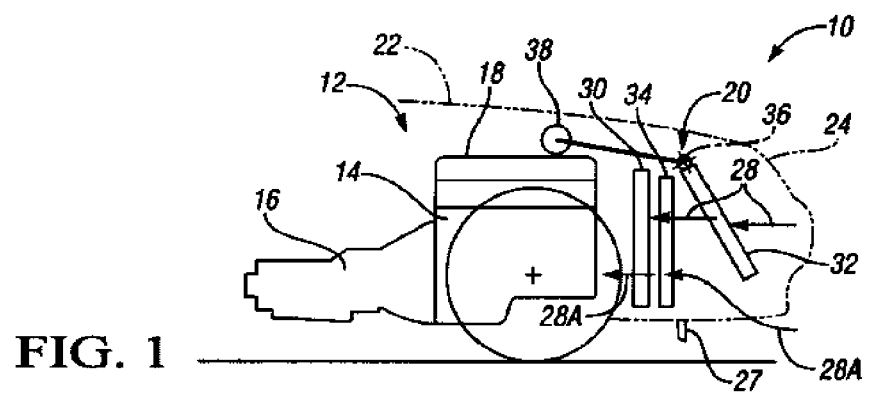
FIG. 1 is a schematic side view of a front portion of a vehicle illustrating a heat exchanger system of the present invention illustrating an intercooler radiator in a first position such that an amount of air is allowed to bypass the intercooler radiator.
Figure 2:
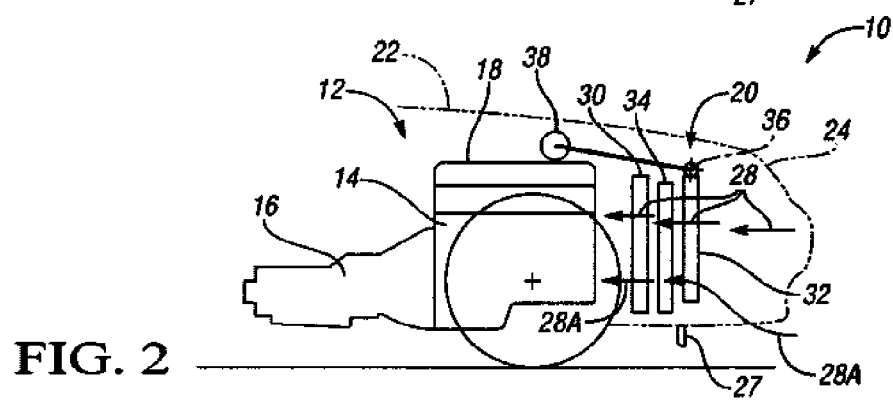
FIG. 2 is a schematic side view of the vehicle of FIG. 1 illustrating the intercooler radiator in a second position.

Referring to the drawings wherein like reference numbers correspond to like or similar components throughout the several figures there is shown in FIGS. 1 and 2 a schematic side view of a front portion of a vehicle, generally indicated at 10. The vehicle 10 includes a powertrain 12 having an engine 14 operatively connected to a transmission 16. The engine 14 is preferably a supercharged internal combustion engine, wherein a supercharger 18 is operatively connected to the engine 14 and is operable to provide pressurized intake air to the engine 14 to increase the volumetric efficiency thereof. Additionally, the vehicle 10 includes a heat exchanger system 20 operable to reject heat energy produced by various components of the vehicle 10. A body structure 22 serves to substantially encapsulate or cover the powertrain 12 and the heat exchanger system 20. The body structure 22 includes a front fascia 24 defining at least one opening 26, shown in FIG. 3, configured to pass air, indicated by arrows 28, therethrough for subsequent communication to the heat exchanger system 20. An air dam 27 is disposed beneath the front fascia 24 and is configured to direct air 28 toward the heat exchanger system 20. The air 28 absorbs heat energy rejected by the heat exchanger system 20 as the air 28 passes through the heat exchanger system 20 and, as such, operates as a cooling medium.

The heat exchanger system 20 includes a first heat exchanger, such as a radiator 30, operable to cool the engine 14 and a second heat exchanger, such as an intercooler radiator 32, operable to cool the intake air charge exiting the supercharger 18 prior to the intake air entering the engine 14. The intercooler radiator 32 may be an air-to-air radiator or an liquid-to-air radiator. It is beneficial to cool the intake air entering the engine 14 to increase the density of the intake air and enable greater spark advance (for spark ignited engines) thereby increasing the performance of the engine 14. The heat exchanger system 20 further includes a third heat exchanger, such as a condenser 34, operable to cool refrigerant contained within an air conditioning system, not shown, of the vehicle 10.

Figure 3:
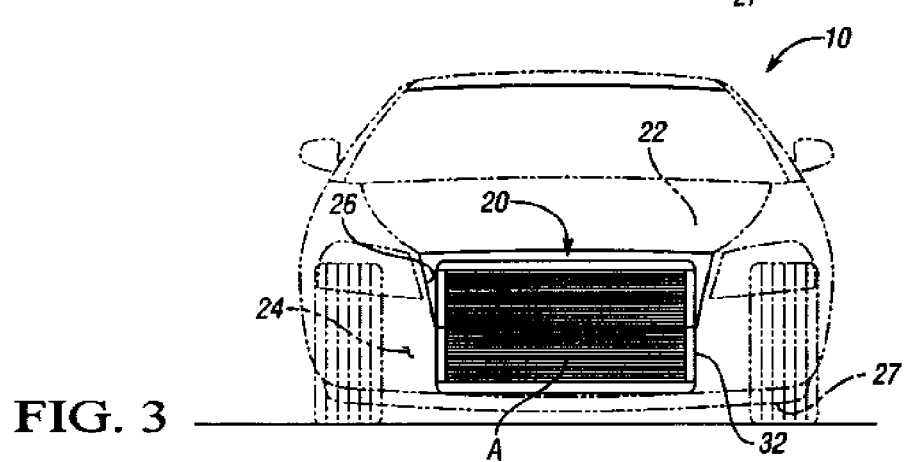
FIG. 3 is a schematic front view of the vehicle of FIG. 1.

The intercooler radiator 32 is movable or pivotable with respect to the radiator 30 and the condenser 34 about point 36. The intercooler radiator 32 is movable between a first position, shown in FIG. 1, and a second position, shown in FIG. 2 via an actuator 38. The actuator 38 may be any type know to those skilled in the art configured to selectively and variably move the intercooler radiator 32 between the first and second positions. Referring to FIG. 3, there is shown a schematic frontal view of the vehicle 10 of FIGS. 1 and 2. In a preferred embodiment the frontal area, indicated at A, of each of the intercooler radiator 32, condenser 34, and radiator 30 are substantially similar.

With the intercooler radiator 32 in the first position, as shown in FIG. 1, an amount of air 28A is allowed to bypass the intercooler radiator 32 and instead flow directly to the condenser 34 and radiator 30 thereby reducing the amount of restriction to the air 28, 28A flowing through the heat exchanger system 20 and increasing the amount of air 28, 28A available to cool the condenser 34 and radiator 30. This mode of operation is especially beneficial for low supercharger boost, low vehicle speed driving schedules, such as when the vehicle 10 is driven in city traffic. By allowing an amount of air 28A to bypass the intercooler radiator 32, the performance of the air conditioning system, not shown, and adequate cooling of the engine 14 can be maintained.

With the intercooler radiator 32 in the second position, as shown in FIG. 2, substantially all of the air 28, 28A passes through the intercooler radiator 32 prior to entering the condenser 32 and the radiator 30. This mode of operation is especially beneficial for high supercharger boost, high vehicle speed driving schedules where the "ram air" effect of the high speed air 28, 28A passing through the heat exchanger system 20 is sufficient to provide a requisite amount of air 28, 28A to effect cooling of the condenser 32 and the radiator 30, thereby ensuring the proper performance of the air conditioning system and cooling of the engine 14. The actuator 38 is preferably configured to move the intercooler radiator 32 to any position between the first and second positions thereby allowing the amount of air 28A bypassing the intercooler radiator 32 to be varied as a function of the operating conditions of the vehicle 10.

Figure 4:
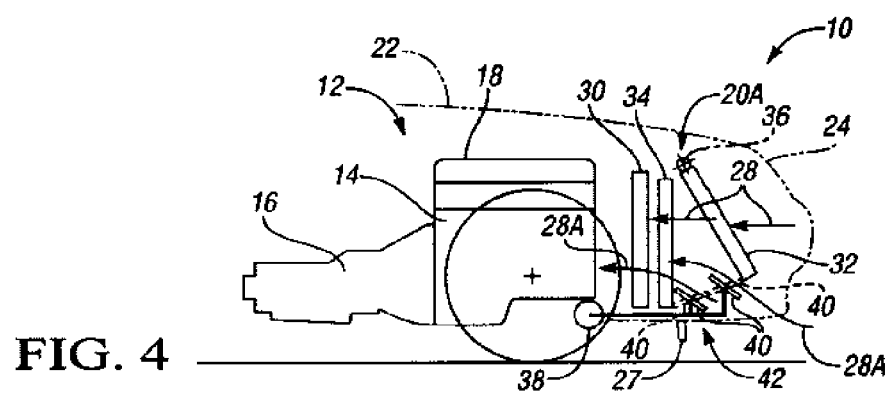
FIG. 4 is a schematic side view of the vehicle of FIGS. 1 through 3, illustrating an alternate embodiment of the heat exchanger system of the present invention.

Referring now to FIG. 4, there is shown the vehicle 10 of FIGS. 1 through 3 having an alternate embodiment of the heat exchanger system 20, generally indicated at 20A. The intercooler radiator 32 of the heat exchanger system 20A is spaced from the condenser 34 and the radiator 30 forming a space 42. A plurality of louvers or shutters 40 are disposed within the space 42 and are selectively and variably controlled by the actuator 38 between a first position or open position, shown in solid lines, and a second position or closed position, shown in dashed lines. With the shutters 40 in the first position an amount of air 28A is allowed to bypass the intercooler radiator 32 and instead flow directly to the condenser 34 and radiator 30 thereby reducing the amount of restriction to the air 28, 28A flowing through the heat exchanger system 20A and increasing the amount of air 28, 28A available to cool the condenser 34 and radiator 30. This mode of operation is especially beneficial for low supercharger boost, low vehicle speed driving schedules, such as when the vehicle 10 is driven in city traffic. By allowing an amount of air 28A to bypass the intercooler radiator 32, the performance of the air conditioning system and adequate cooling of the engine 14 can be maintained.

Alternately, with the shutters 40 in the second position, shown in dashed lines, substantially all of the air 28, 28A passes through the intercooler radiator 32 prior to entering the condenser 32 and the radiator 30. This mode of operation is especially beneficial for high supercharger boost, high vehicle speed driving schedules where the "ram air" effect of the high speed air 28, 28A passing through the heat exchanger system 20A is sufficient to provide a requisite amount of air 28, 28A to effect cooling of the condenser 32 and the radiator 30, thereby ensuring the proper performance of the air conditioning system and adequate cooling of the engine 14. The actuator 38 is preferably configured to move the shutters 40 to any position between the first and second positions thereby allowing the amount of air 28A bypassing the intercooler radiator 32 to be varied as a function of the operating conditions of the vehicle 10.

A method of operating the heat exchanger systems 20, of FIGS. 1 through 3, and 20A, of FIG. 4, is also provided. The method includes the steps of: A) directing air 28, 28A through each of the radiator 30 and intercooler radiator 32 when the vehicle 10 is operating in a first predetermined operating condition; and B) bypassing or diverting an amount of air 28A away from the intercooler radiator 32 and to the radiator 30 when the vehicle 10 is operating in a second predetermined operating condition. The first predetermined operating condition may include at least one of vehicle being speed greater than or equal to a predetermined vehicle speed value and intake air temperature being greater than or equal to a predetermined intake air temperature value. Additionally, the second predetermined operating condition may be at least one of vehicle speed being less than the predetermined vehicle speed value, air temperature being greater than or equal to a predetermined air temperature value, intake air pressure being less than a predetermined intake air pressure value, and air conditioning system head pressure being greater than or equal to a predetermined air conditioning system head pressure value. Diverting the amount of air 28A away from the intercooler radiator 32 may be accomplished by moving the intercooler radiator 32 with respect to the radiator 30, as shown in FIG. 1, or by selectively opening the shutters 40, as shown in FIG. 4.

By providing variable flow paths for air 28A passing through the intercooler radiator 32, the frontal area of the intercooler radiator 32 may be substantially increased, thereby improving the performance of the engine 14 under high duty cycle conditions. While the best modes for carrying out the invention have been described in detail, those familiar with the art to which this invention relates will recognize various alternative designs and embodiments for practicing the invention within the scope of the appended claims.

The invention claimed is:

1. A heat exchanger system for a vehicle having a front end and an opposing rear end, said heat exchanger system comprising:
   a first heat exchanger configured to receive a flow of air through the front end of the vehicle in response to movement of the vehicle and to pass said air therethrough;
   a second heat exchanger mounted upstream of said first heat exchanger and configured to receive said flow of air through the front end of the vehicle in response to movement of the vehicle and to pass said air therethrough;

wherein said second heat exchanger is selectively movable during operation of the vehicle between a first position for operating the vehicle in a first pre-determined operating condition and a second position for operating the vehicle in a second pre-determined operating condition;

wherein an amount of said air bypasses said second heat exchanger to flow directly into said first heat exchanger when said second heat exchanger is positioned in said first position and wherein substantially all of said air flows through said second heat exchanger prior to flowing through said first heat exchanger when said second heat exchanger is positioned in said second position.

2. The heat exchanger system of claim 1, wherein said first and second heat exchangers share substantially the same frontal area.

3. The heat exchanger system of claim 1, wherein said second heat exchanger is pivotable with respect to said first heat exchanger.

4. The heat exchanger system of claim 1, wherein said first heat exchanger is an engine radiator.

5. The heat exchanger system of claim 1, wherein said second heat exchanger is an intercooler radiator.

6. The heat exchanger system of claim 1, wherein the vehicle includes a front fascia defining at least one opening configured to pass said air therethrough and wherein said first and second heat exchangers are disposed downstream with respect to said front fascia.

7. The heat exchanger system of claim 1, further comprising a third heat exchanger disposed between said first and second heat exchangers and wherein said third heat exchanger is an air conditioning condenser.

8. The heat exchanger system of claim 1, further comprising an actuator assembly configured to variably move said second heat exchanger between said first position and said second position.

9. The heat exchanger system of claim 1, wherein said second heat exchanger is infinitely adjustable to any position between said first and second positions.

10. A heat exchanger system for a vehicle having a front end and an opposing rear end, said heat exchanger system comprising:

an engine;

a supercharger operatively connected to the engine and configured to provide a pressurized intake charge to the engine;

an engine radiator operatively connected to the engine to receive heat therefrom, and configured to receive a flow of air through the front end of the vehicle in response to movement of the vehicle and to pass said air therethrough;

an intercooler radiator operatively connected to the supercharger and configured to cool the pressurized intake charge prior to the intake charge entering the engine, the intercooler radiator being configured to receive said flow of air through the front end of the vehicle in response to movement of the vehicle and to pass said air therethrough;

at least one shutter being selectively movable during operation of the vehicle between a first position for operating the vehicle in a first pre-determined operating condition and a second position for operating the vehicle in a second pre-determined operating condition;

wherein an amount of said air bypasses the intercooler radiator to flow directly into the engine radiator when said at least one shutter is positioned in said first position and wherein substantially all of said air flows through the intercooler radiator prior to flowing through the engine radiator when said at least one shutter is positioned in said second position.

11. The heat exchanger system of claim 10, wherein the engine radiator and the intercooler radiator share substantially the same frontal area.

12. The heat exchanger system of claim 10, wherein the vehicle includes a front fascia defining at least one opening configured to pass said air therethrough and wherein the engine radiator and the intercooler radiator are disposed downstream with respect to said front fascia.

13. The heat exchanger system of claim 10, further comprising an actuator assembly configured to variably move said at least one shutter between said first position and said second position.

14. A method of operating a heat exchanger system for a vehicle having a front end and an opposing rear end, a radiator disposed adjacent the front end of the vehicle and operatively connected to an internal combustion engine to receive heat therefrom, and an intercooler radiator disposed adjacent the front end of the vehicle and operatively connected to a supercharger to cool intake air communicated to the internal combustion engine, wherein the radiator and the intercooler radiator are configured to receive a flow of air through the front end of the vehicle in response to movement of the vehicle to pass the air therethrough, the method comprising:

directing substantially all of the air through both of the radiator and intercooler radiator when the vehicle is operating in a first predetermined operating condition; and bypassing an amount of said air away from the intercooler radiator to flow the bypass air directly into the radiator when the vehicle is operating in a second predetermined operating condition.

15. The method of claim 14, wherein the first predetermined operating condition is at least one of vehicle speed being greater than or equal to a predetermined vehicle speed value and intake air temperature being greater than or equal to a predetermined intake air temperature value.

16. The method of claim 14, wherein the second predetermined operating condition is at least one of vehicle speed being less than a predetermined vehicle speed value, air temperature being greater than or equal to a predetermined air temperature value, intake air pressure being less than a predetermined intake air pressure value, and air conditioning system head pressure being greater than or equal to a predetermined air conditioning system head pressure value.

17. The method of claim 14, wherein said bypassing said amount of said air away from the intercooler radiator is accomplished by moving the intercooler radiator with respect to the radiator.

18. The method of claim 14, wherein said bypassing said amount of said air away from the intercooler radiator is accomplished by selectively opening at least one shutter operable to allow said amount of said air to bypass the intercooler radiator.

* * * * *